United States Patent
Villaume et al.

(10) Patent No.: US 7,340,327 B2
(45) Date of Patent: Mar. 4, 2008

(54) LONGITUDINAL PILOTING SYSTEM FOR A TAXIING AIRCRAFT

(75) Inventors: Fabrice Villaume, Toulouse (FR); Jean Duprez, Blagnac (FR)

(73) Assignee: Airbus France, Toulouse (FR)

( * ) Notice: Subject to any disclaimer, the term of this patent is extended or adjusted under 35 U.S.C. 154(b) by 394 days.

(21) Appl. No.: 11/104,548

(22) Filed: Apr. 13, 2005

(65) Prior Publication Data

US 2005/0234609 A1    Oct. 20, 2005

(30) Foreign Application Priority Data

Apr. 16, 2004  (FR) .................................. 04 03972

(51) Int. Cl.
*G06F 19/00*    (2006.01)

(52) U.S. Cl. .......................................... 701/15; 701/3

(58) Field of Classification Search ................ 701/3, 701/14, 15; 340/947–949, 951
See application file for complete search history.

(56) References Cited

U.S. PATENT DOCUMENTS

| 4,822,113 A | * | 4/1989 | Amberg et al. ............. 303/191 |
| 5,386,954 A | * | 2/1995 | Bissey et al. ............... 244/181 |
| 6,241,183 B1 | | 6/2001 | Mathieu |
| 2003/0125848 A1 | | 7/2003 | Otake et al. |

FOREIGN PATENT DOCUMENTS

FR          2770824          5/1999

* cited by examiner

*Primary Examiner*—Yonel Beaulieu
(74) *Attorney, Agent, or Firm*—Stevens, Davis, Miller & Mosher, LLP.

(57) ABSTRACT

The system includes a plurality of engines that generate a thrust of an aircraft, each of the engines controlled by a first controllable actuator. A plurality of brakes reduce the speed of the aircraft when it is taxiing, each of the brakes controlled by a second controllable actuator. A control unit generates a piloting setpoint that relates to the longitudinal behavior of the aircraft. A central processing unit automatically determines, from the piloting setpoint, a plurality of individual control commands that are applied automatically to the first and second actuators and used to satisfy the piloting setpoint and a usage objective for the actuators.

9 Claims, 2 Drawing Sheets

LONGITUDINAL PILOTING SYSTEM FOR A TAXIING AIRCRAFT

FIELD OF THE INVENTION

The present invention relates to a longitudinal piloting system for an aircraft, in particular a civilian transport airplane, when taxiing, in particular on an airstrip or a taxiing strip of an airport.

BACKGROUND OF THE RELATED ART

Usually, to control the taxiing speed of an aircraft, the pilot has gas control handles (designed to directly control the thrust generated by the engines of the aircraft) and brake pedals (designed to directly control the pressure applied in the wheel brakes).

The pilot of the aircraft is therefore able to act directly on the engine speed and on the braking pressure. These two types of control are obviously separate and must be controlled individually. The result is a significant piloting workload in order to be able to maintain or obtain a desired taxiing speed, and a non-optimal use of the engines and the brakes (premature wear, fuel consumption, etc).

In practice, in addition to generating a significant piloting activity when taxiing, this usual solution presupposes a sometimes excessive use of the actuators (relating to the engines and the brakes) which can bring about an increase in the wear or an unwanted increase in the brake temperatures (with a direct impact on stopover times in certain conditions).

SUMMARY OF THE INVENTION

The object of the present invention is to overcome these problems. It relates to a longitudinal piloting system for a taxiing aircraft, used to facilitate and improve speed control when taxiing.

To this end, according to the invention, said system of the type including:
- a plurality of engines designed to generate a thrust of the aircraft, each of said engines being controlled by a first associated controllable actuator, in accordance with a received control command; and
- a plurality of brakes designed to reduce the speed of the aircraft when it is taxiing, each of said brakes being controlled by a second associated controllable actuator, in accordance with a received control command, is noteworthy in that it also includes:
- a control unit designed to generate a piloting setpoint which relates to the longitudinal behavior of the aircraft and which is global; and
- a central processing unit for automatically determining, from said piloting setpoint, a plurality of individual control commands which are automatically applied respectively to said first and second actuators and which, as applied to said first and second actuators, satisfy said piloting setpoint, and a usage objective of said actuators.

Said piloting system according to the invention can thus be used to control by objective the speed of the aircraft by acting automatically and optimally on the brakes and the engines. The pilot controls the piloting setpoint (a speed or speed variation) and no longer needs to act directly on the engines and the brakes.

Consequently, the piloting of the aircraft is made more stable and instinctive, which makes the behavior of the aircraft more uniform and lightens the workload of the crew.

It will be seen that the system of the present invention can control equally the wheel brakes of the aircraft and the aerodynamic brakes of the latter, such as the air-brakes.

Moreover, in a first embodiment, said central processing unit includes:
- first means for determining an overall longitudinal action, such as a load or a load variation, representative of said piloting setpoint;
- second means for distributing said overall longitudinal action between a plurality of individual actions relating to said first and second actuators so as to satisfy said usage objective; and
- third means for determining, from said individual actions, corresponding individual control commands, to be applied to said first and second actuators.

Furthermore, in a second embodiment, said central processing unit includes:
- first means for generating, from said piloting setpoint, individual control commands to be applied to said first and second actuators; and
- second means for modifying said individual control commands so as to satisfy said usage objective, and said piloting setpoint.

Moreover, different types of use of said piloting system can be envisaged. Thus, advantageously, said control unit can include:
- a specific control device designed to be actuated by a pilot of the aircraft, said piloting setpoint depending on the actuation of said control device; and/or
- a selection means enabling a pilot of the aircraft to select a setpoint value, said piloting setpoint depending on the duly selected setpoint value; and/or
- a system comprising:
  - a means for determining the current speed of the aircraft; and
  - a means for computing a setpoint value enabling the aircraft to maintain said current speed, said piloting setpoint depending on the duly computed setpoint value.

Furthermore, in an embodiment, said control unit generates, as piloting setpoint, an acceleration setpoint, whereas, in a variation, it generates, as piloting setpoint, a speed setpoint.

Moreover, in a preferred embodiment, said central processing unit implements a usage objective relating to said first and second actuators, with the following characteristics:
- when said first actuators relating to a thrust mode are activated, said central processing unit determines a setpoint N1 relating to the speed of rotation of the low pressure module of the engines, it compares this setpoint N1 with an idling speed, and:
  - as long as said setpoint N1 is greater than said idling speed, it retains said thrust mode; and
  - when said setpoint N1 becomes less than or equal to said idling speed, it switches to a braking mode, for which said second actuators are activated and said first actuators are disabled;
- when said second actuators relating to said braking mode are activated, said central processing unit determines a pressure setpoint, and:
  - as long as said pressure setpoint is positive, it retains said braking mode; and when said pressure setpoint becomes negative, it switches to said thrust mode, for which said first actuators are activated and said second actuators are disabled.

BRIEF DESCRIPTION OF THE DRAWINGS

An understanding of how the invention can be produced will be obtained from the figures of the appended drawing. In these figures, identical references denote like elements.

DETAILED DESCRIPTION OF THE INVENTION

Figure 1:
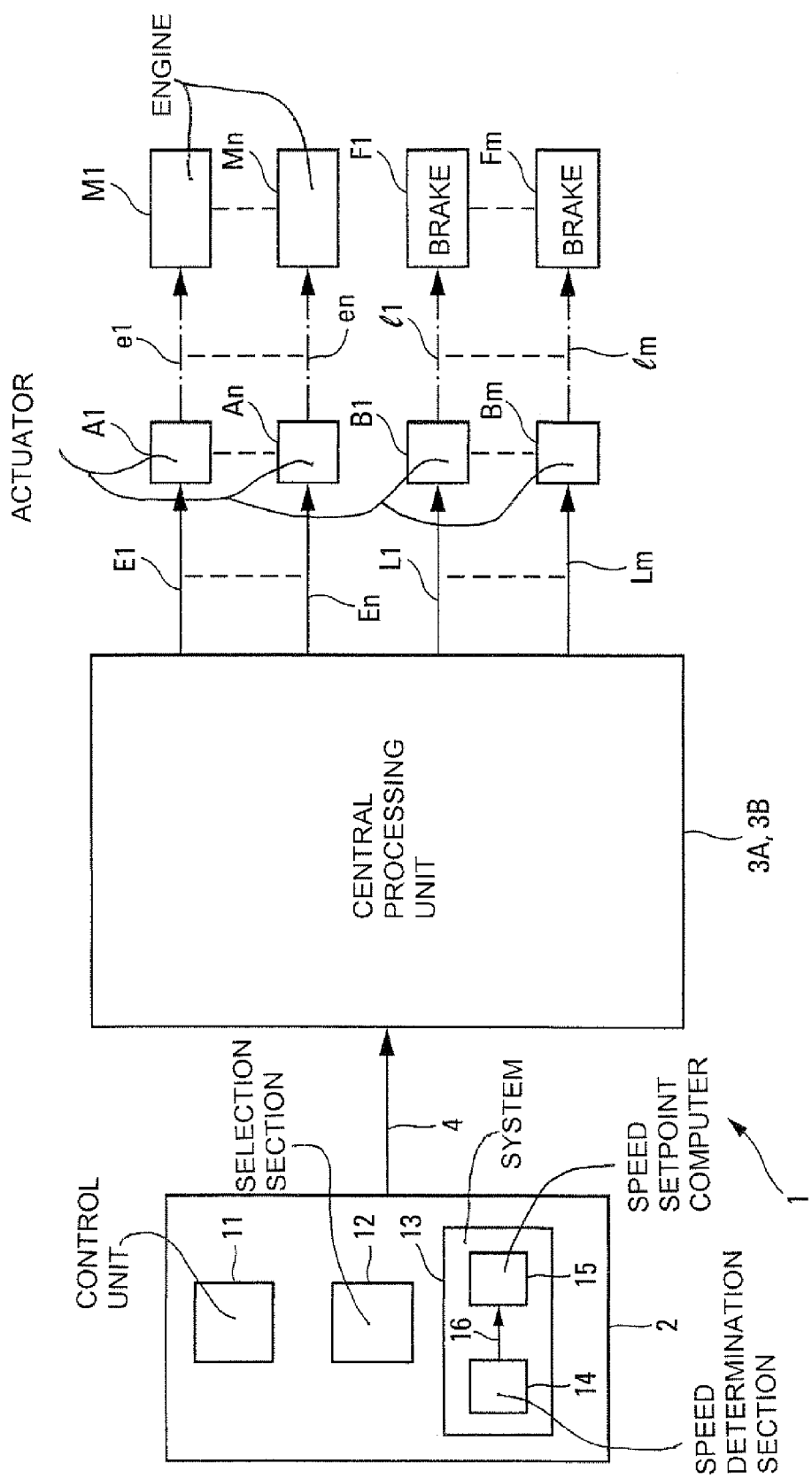
FIG. 1 is a block diagram of a piloting system according to the invention.

The system 1 according to the invention and diagrammatically represented in FIG. 1 is a longitudinal piloting system for an aircraft, in particular for a civilian transport aircraft, not represented and taxiing, in particular on an airport platform, which is used to facilitate and improve the control of the speed of said aircraft when taxiing.

To control the speed of the aircraft, said piloting system 1 normally includes:
a plurality of engines M1 to Mn, n being an integer greater than or equal to 2, designed to generate a thrust of the aircraft, each of said engines M1 to Mn usually being controlled by a first integrated controllable actuator A1 to An (as illustrated by links e1 to en in chain dotted lines in FIG. 1), according to a received control command; and
a plurality of brakes F1 to Fm, m being an integer greater than 2, designed to reduce the speed of the aircraft when it is taxiing, each of said brakes F1 to Fm normally being controlled by a second integrated controllable actuator B1 to Bm (as illustrated by links f1 to fm in chain dotted lines), according to a received control command.

According to the invention, said piloting system 1 also includes:
a control unit 2 designed to generate a piloting setpoint detailed below, which relates to the longitudinal behavior of the aircraft and which is global; and
a central processing unit 3A, 3B which is linked by a link 4 to said control unit 2, to determine automatically, from said piloting setpoint, a plurality of individual control commands which are applied automatically to said actuators A1 to An and B1 to Bm respectively via links E1 to En and L1 to Lm and which, as applied to said actuators A1 to An and B1 to Bm, satisfy said piloting setpoint, and a usage objective detailed below of said actuators A1 to An and B1 to Bm.

Said piloting system 1 according to the invention can thus be used to control by objective the speed or a speed variation of the aircraft, by acting automatically and optimally on the brakes F1 to Fm and the engines M1 to Mn. The pilot controls only said piloting setpoint (a speed or a speed variation), in other words a global setpoint, and no longer has to act directly on the engines and the brakes.

Consequently, the piloting of the aircraft is made more stable and instinctive, which makes the behavior of the aircraft more uniform and lightens the workload of the crew.

Figure 2:
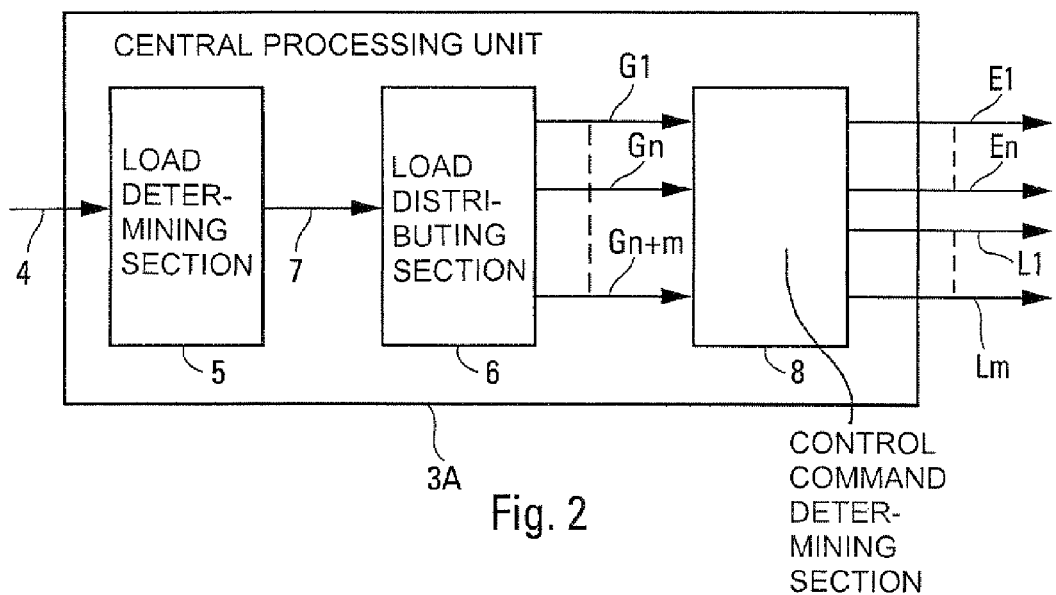
FIGS. 2 and 3 diagrammatically illustrate two embodiments of a central processing unit of a piloting system according to the invention.

Moreover, in a first embodiment represented in FIG. 2, said central processing unit 3A includes:
means 5 which are linked to the link 4, for determining a load (or force) or overall longitudinal load variation, representative of said piloting setpoint and therefore having to be applied by the engines M1 to Mn and the brakes F1 to Fm;
means 6 which are linked via a link 7 to said means 5, for distributing said load or said overall longitudinal load variation between a plurality of loads or individual load variations relating to said actuators A1 to An and B1 to Bm so as to satisfy said usage objective, said means 6 thus providing supervision of the distribution; and
a means 8 for determining, from said loads or individual load variations received via links G1 to Gm+n, corresponding individual control commands to be applied directly to said actuators A1 to An and B1 to Bm, via said links E1 to En and L1 to Lm.

Figure 3:
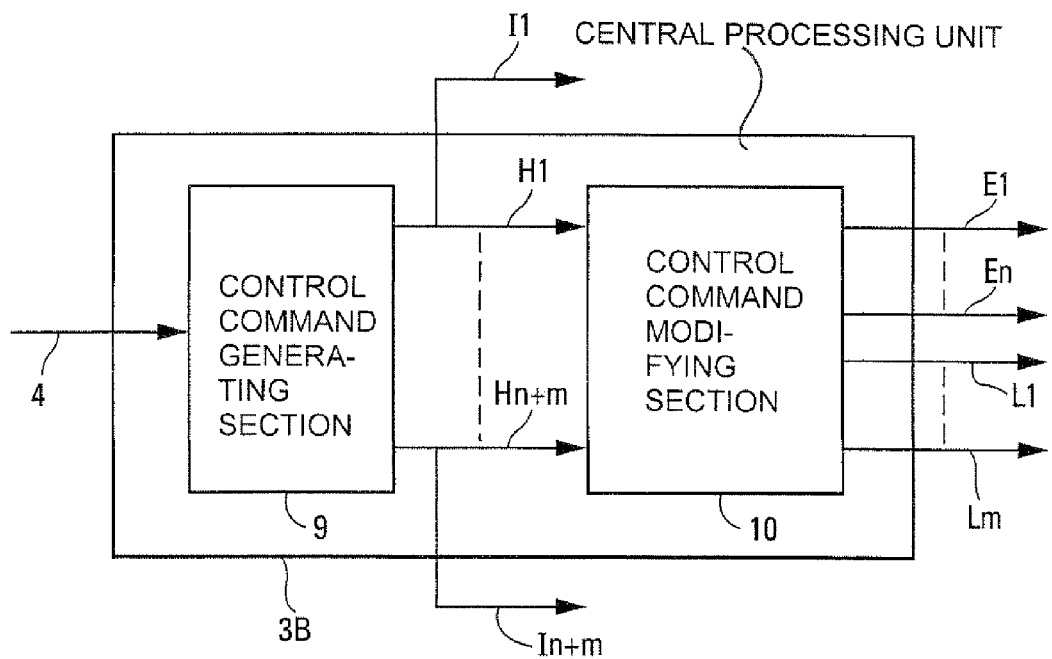

Furthermore, in a second embodiment represented in FIG. 3, said central processing unit 3B includes:
means 9 linked to the link 4, for generating, from said piloting setpoint, individual control commands to be applied to said actuators A1 to An and B1 to Bm via links I1 to Im+n (linked for example to the links E1 to En and L1 to Lm); and
means 10 for modifying said individual control commands received via links H1 to Hm+n so as to satisfy said usage objective, and said piloting setpoint. The duly modified individual control commands are transmitted directly to the actuators A1 to An and B1 to Bm via said links E1 to En and L1 to Lm.

In the context of the present invention, various types of use of said piloting system 1 can be envisaged. Thus, said control unit 2 can include in particular, as is diagrammatically represented in FIG. 1:
a specific control unit 11 which can be actuated, for example a control column, designed to be actuated by a pilot of the aircraft, the piloting setpoint transmitted by the link 4 then depending on the actuation of said control unit 11;
a standard selection means 12, for example a rotary knob, enabling a pilot of the aircraft to select a setpoint value, in particular a setpoint speed, the piloting setpoint transmitted by the link 4 then depending on the duly selected setpoint value;
a system 13 comprising:
a means 14 for determining, in the normal manner, the current speed of the aircraft; and
a means 15 linked by a link 16 to the means 14, for computing a setpoint value enabling the aircraft to maintain said current speed, said piloting setpoint then depending on the duly computed setpoint value.

Furthermore, in a first embodiment, said control unit 2 generates, as piloting setpoint, an acceleration setpoint, whereas, in a second embodiment, it generates, as piloting setpoint, a speed setpoint.

It will be noted that these last two embodiments are based on one and the same control law (an acceleration mode piloting law). In practice, the speed mode piloting law corresponds to the succession of two subsets:
a first control system, the aim of which is to deduce an acceleration setpoint from the speed setpoint (and from the measurement of the latter); and
the acceleration mode piloting law generating the setpoints to be sent to the actuators.

Different types of usage objective (or of order or priority of use) of the different actuators A1 to An and B1 to Bm can be implemented in the context of the present invention.

However, in a preferred embodiment, said central processing unit 3A, 3B implements a usage objective relating to said actuators A1 to An and B1 to Bm, with the following characteristics:

when said actuators A1 to An relating to a thrust mode (engines M1 to Mn in action) are activated (that is, are controlled and therefore receive individual control commands), said central processing unit 3A, 3B determines a setpoint N1 relating to the speed of rotation of the low pressure module of the engines M1 to Mn, it compares this setpoint N1 to a predetermined idling speed, and:

as long as said setpoint N1 is greater than said idling speed, it retains said thrust mode; and when said setpoint N1 becomes less than or equal to said idling speed, it switches to a braking mode, for which said actuators B1 to Bm are activated (that is, are controlled and therefore receive individual control commands) and said actuators A1 to An are disabled (that is, are controlled and receive control commands corresponding to a neutral action);

when said actuators B1 to Bm relating to said braking mode (brakes F1 to Fm in action) are activated, said central processing unit 3A, 3B determines a pressure setpoint, and:

as long as said pressure setpoint is positive, it retains said braking mode; and when said pressure setpoint becomes zero or negative, it switches to said thrust mode, for which said actuators A1 to An are activated and said actuators B1 to Bm are disabled.

In the context of the present invention:

the setpoint for the engines can also be a setpoint other than said setpoint N1, for example, a setpoint EPR of the engine pressure ratios; and the setpoint for the brakes can also be a setpoint other than said pressure setpoint, for example a braking torque setpoint.

The invention claimed is:

1. A longitudinal piloting system for a taxiing aircraft, said system including:

a plurality of engines that generates a thrust of the aircraft, each of said engines being controlled by a first associated controllable actuator, in accordance with a received control command; and a plurality of brakes that reduces the speed of the aircraft when the aircraft is taxiing, each of said brakes being controlled by a second associated controllable actuator, in accordance with a received control command, said system further including:

a control unit that generates a piloting setpoint which relates to the longitudinal behavior of the aircraft; and a central processing unit for automatically determining, from said piloting setpoint, a plurality of individual control commands which are automatically applied respectively to said first and second actuators and which, as applied to said first and second actuators, satisfy said piloting setpoint, as well as a usage objective of said first and second actuators.

2. The system as claimed in claim 1, wherein said central processing unit includes:

first means for determining an overall longitudinal action representative of said piloting setpoint;

second means for distributing said overall longitudinal action between a plurality of individual actions relating to said first and second actuators so as to satisfy said usage objective; and third means for determining, from said individual actions, corresponding individual control commands, to be applied to said first and second actuators.

3. The system as claimed in claim 1, wherein said central processing unit includes:

first means for generating, from said piloting setpoint, individual control commands to be applied to said first and second actuators; and second means for modifying said individual control commands so as to satisfy said usage objective, and said piloting setpoint.

4. The system as claimed in claim 1, wherein said control unit includes a specific control device for being actuated by a pilot of the aircraft, said piloting setpoint depending on the actuation of said control device.

5. The system as claimed in claim 1, wherein said control unit includes a selection means for enabling a pilot of the aircraft to select a setpoint value, said piloting setpoint depending on the duly selected setpoint value.

6. The system as claimed in claim 1, wherein said control unit includes:

a means for determining the current speed of the aircraft; and a means for computing a setpoint value enabling the aircraft to maintain said current speed, said piloting setpoint depending on the duly computed setpoint value.

7. The system as claimed in claim 1, wherein said control unit generates, as piloting setpoint, an acceleration setpoint.

8. The system as claimed in claim 1, wherein said control unit generates, as piloting setpoint, a speed setpoint.

9. The system as claimed in claim 1, wherein said central processing unit implements a usage objective relating to said first and second actuators, with the following characteristics:

when said first actuators relating to a thrust mode are activated, said central processing unit determines a setpoint N1 relating to the speed of rotation of the low pressure module of the engines and compares said setpoint N1 with an idling speed, and:

as long as said setpoint N1 is greater than said idling speed, it retains said thrust mode; and when said setpoint N1 becomes less than or equal to said idling speed, it switches to a braking mode, for which said second actuators are activated and said first actuators are disabled;

when said second actuators relating to said braking mode are activated, said central processing unit determines a pressure setpoint, and:

as long as said pressure setpoint is positive, it retains said braking mode; and when said pressure setpoint becomes zero or negative, it switches to said thrust mode, for which said first actuators are activated and said second actuators are disabled.

\* \* \* \* \*